United States Patent
Larzik

[11] Patent Number: 6,009,796
[45] Date of Patent: Jan. 4, 2000

[54] MARSHMALLOW TOASTING APPARATUS

[76] Inventor: Patrick P. Larzik, 7 Hance Rd., Rumson, N.J. 07760

[21] Appl. No.: 09/200,570
[22] Filed: Nov. 27, 1998
[51] Int. Cl.[7] .................................................. A47J 37/04
[52] U.S. Cl. .......................................... 99/421 A; 99/419
[58] Field of Search ............................. 99/342, 343, 419, 99/421 A

[56] References Cited

U.S. PATENT DOCUMENTS

| | | | |
|---|---|---|---|
| 2,876,694 | 3/1959 | Thomas | 99/421 A |
| 2,935,013 | 5/1960 | Onori | 99/419 |
| 4,176,592 | 12/1979 | Doyle, Jr. | 99/421 A X |
| 5,172,628 | 12/1992 | Pillsbury et al. | 99/421 A X |

FOREIGN PATENT DOCUMENTS

| | | | |
|---|---|---|---|
| 1585853 | 2/1970 | France | 99/421 A |

Primary Examiner—Reginald L. Alexander
Attorney, Agent, or Firm—Charles I. Brodsky

[57] ABSTRACT

A marshmallow toasting stick, particularly suited for camp fire use, including a substantially round wooden stick of a length $L_1$ and a cross-sectional diameter $D_1$, a substantially round handle at a first end of the stick of a smaller length $L_2$ and a larger cross-sectional diameter $D_2$, and a taper at a second opposite end of the stick to a blunt point of still smaller cross-sectional diameter $D_3$, with the handle color-coded for identifying the user of the stick, and with the stick and handle dimensions being selected so that one or more marshmallows could be suspended over the flames of a camp fire from a distance which protects an adult or child user from the heat of the fire.

17 Claims, 1 Drawing Sheet

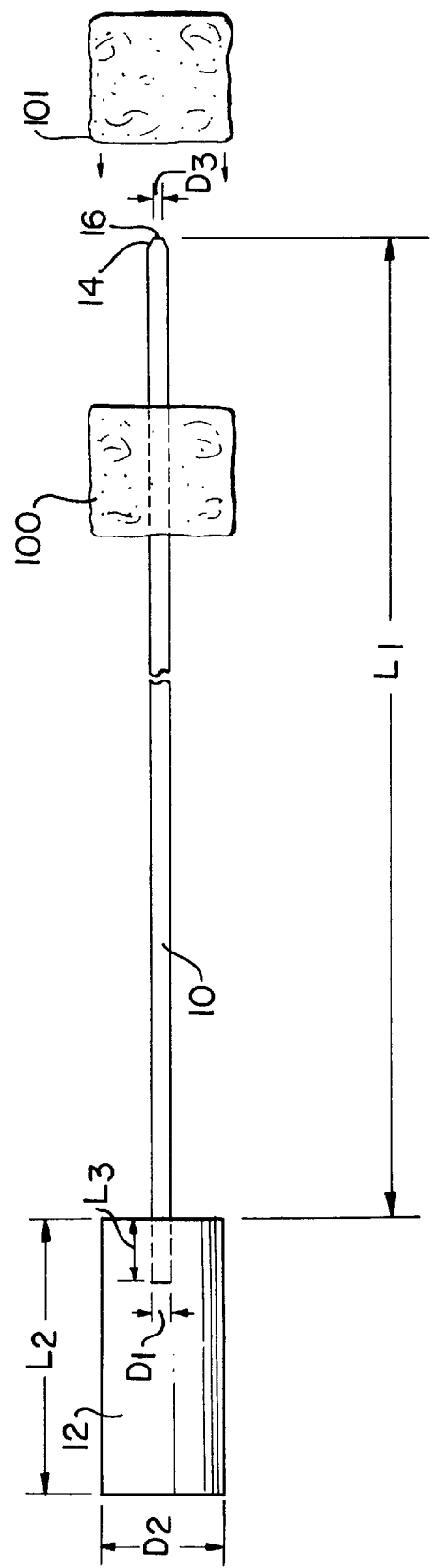

MARSHMALLOW TOASTING APPARATUS

FIELD OF THE INVENTION

This invention relates to recreational activities and, more particularly, to one type of participation which is oftentimes looked upon as a group activity, as contrasted with such activities as fishing, hunting, golf, and the like, more looked upon for individual involvement.

BACKGROUND OF THE INVENTION

As many would agree, one of the most enjoyable recreational activities is that of outdoor camping. And, as almost all would agree, one of the most pleasurable aspects of the camping experience is just sitting around the camp fire at night, toasting marshmallows. Whether it be accompanied by singing, telling ghost stories, or merely talking or joking with one another, these get-togethers—either as a family unit by itself, or together with other family units—such "toastings" frequently are preceded by a going out into the woods to try to find that one perfect stick to use in piercing the marshmallow, and extending it into the fire.

Difficulties arise in this looking-about, however, in several respects: first, it almost always occurs at dusk or as it is getting darker, when spotting the "perfect" stick becomes difficult with the reduced light; second, when the "looking" is being done by a child, the result oftentimes is the bringing-back of a stick which is either too thin (unable to support the weight of the marshmallow or marshmallows to be held), or too thick (unable to pierce the marshmallow without destroying its integrity), or too short (requiring the child to sit close to the fire to position the marshmallow properly); and third—perhaps more important today—, camp grounds by and large prohibit the cutting-down of any sticks or limbs or otherwise destroying the natural growth, of the type useful in reaching over and extending the marshmallow above the flames of the camp fire. As a result then, whether the family member be an adult or child, he or she is thus reduced to having to walk along the trail trying to locate that marshmallow stick that will satisfy all these objectives—not, generally, an easy thing to do as darkness comes.

OBJECTS OF THE INVENTION

It is an object of the present invention, therefore, to provide a new and improved marshmallow toasting stick that lends itself to this camp fire activity.

It is an object of the present invention, also, to provide such a marshmallow stick which can be used over-and-over again, and stored away after use.

It is another object of the invention to provide such a marshmallow stick which is identifiable to the same person or family member on subsequent use, so that each one knows which stick is theirs, and so that problems do not arise as to which stick belongs to whom.

It is an additional object of the invention to provide such a marshmallow stick which is easy to fabricate and inexpensive to manufacture, so as to allow for sale at a reasonable price—at the camp grounds store, for example.

It is a further object of the invention to provide such a marshmallow stick which is devoid of sharp edges which could otherwise pierce a person's skin in use, or elsewise cause injury.

It is yet another object of the invention to provide a marshmallow stick which can be used by adult and child alike, and which can support one or several marshmallows being toasted at the same time, with a soft wood that is typically resistant to burning.

SUMMARY OF THE INVENTION

As will become clear from the following description, a marshmallow toasting stick embodying the invention, particularly suited for camp fire use, includes a substantially round, wooden stick of a length $L_1$ and a cross-sectional diameter $D_1$, a substantially round handle at a first end of the stick of a smaller length $L_2$ and a larger cross-sectional diameter $D_2$, and a taper at a second, opposite end of the stick to a blunt point of still smaller cross-sectional diameter $D_3$. In accordance with the invention, the substantially round handle is color-coded for identifying the user, as by a non-toxic latex paint, for example—in one of a red, blue, yellow and white presentation. With both the stick and handle fabricated of a slow burning-wood (such as pine), the dimensions of the stick, the handle, and the taper are selected so as to allow grasping by a child and by an adult alike—and to allow for the suspension of at least one marshmallow into the camp fire by a puncture thereof at the tapered end of the stick and at a distance which protects the user from the heat of the fire.

Thus, according to a preferred embodiment of the invention, the length ($L_2$) of the substantially round handle and the length ($L_1$) of the substantially round, wooden stick are selected to be 5 inches and 35 inches, respectively. At the same time, the diameters of the handle ($D_2$) and of the stick ($D_1$) are selected to be 1¼ inch and ¼ inch, respectively. So as to avoid the piercing of the skin, or otherwise producing injury by an accidental stabbing, the taper ($D_3$) at the opposite end of the stick is selected of the order of ⅛ inch diameter. As will be appreciated, the slow-burning characteristics of whatever wood is selected could be enhanced by first dipping the tapered end of the marshmallow stick into water—and only for about 60 seconds or so—from a lake, stream bed or creek, for instance, or from just any wet-producing source.

BRIEF DESCRIPTION OF THE DRAWINGS

These and other features of the present invention will be more clearly understood from a consideration of the following description, taken in connection with the sole Figure of the drawing, of a marshmallow stick which is particularly suited for this camp fire use.

DETAILED DESCRIPTION OF THE DRAWING

Available for sale at a camp grounds store or at a sporting goods outfitter for example—either singly, or in packages of two or more—the marshmallow toasting apparatus of the invention first includes a substantially round, wooden stick 10 of length $L_1$ and cross-sectional diameter $D_1$. A substantially round handle 12 is positioned at a first end of the stick 10, of a smaller length $L_2$ and a larger cross-sectional diameter $D_2$. A taper 14 is located at a second opposite end of the stick 10, to a blunt point 16 of still smaller cross-sectional diameter $D_3$.

In a preferred embodiment of the invention, the handle 12 is color-coded for identifying the user of the marshmallow stick—as the mother, father, son, daughter, etc.—, as with a non-toxic latex paint of a red, blue, yellow or white presentation. Also, in accordance with the invention, the substantially round handle 12 is fabricated of wood, and with the stick 10, is preferably fabricated of a slow-burning wood, such as pine. To further delay any propensity for the camp fire over which the marshmallow will be suspended to itself burn the stick 10, the stick's tapered point 14 may be first immersed in any available liquid, and for any desired period of time, be it for several seconds or several minutes.

So as to facilitate the use of the marshmallow toasting stick by children and adult alike, certain dimensions may be appropriate, although not intended here to be limiting. Thus, the lengths $L_1$ and $L_2$ may be selected to be 35 inches and 5 inches, respectively. The cross-sectional diameters $D_1$ and $D_2$ may likewise be selected of the order of ¼ inch and 1¼ inch, in likewise respective manner. The diameter $D_3$ to which the taper 14 extends may be selected to be ⅛ inch, so as to allow for a puncturing of the marshmallow onto the stick—being not so sharp as to allow for a stabbing effect if accidentally contacting the skin, yet not so large as to destroy the integrity of the marshmallow (i.e. causing it to fall apart) as the marshmallow is being punctured in placement onto the stick. Such a marshmallow already on the stick 10 is identified by the reference numeral 100, with a second marshmallow about to be placed further on the stick being identified by the reference numeral 101.

In an attractive fabrication, the marshmallow stick 10 is fabricated of quarter round pine, with the handle 12 being fabricated of five-quarter-round pine. To add support for the stick 10, so as to allow even up to four or five marshmallows to be placed on the stick 10, the end of the stick opposite the taper 14 is embedded within the handle 12 a distance $L_3$, as indicated, which with the dimensions set forth above is selected some 1 inch. As with any usage by children of apparatus having a pointed end—even if substantially blunted, as at 16—, supervision of its use by an adult is preferred.

While there have been described what are considered to be preferred embodiments of the present invention, it will be readily appreciated by those skilled in the art that modifications can be made without departing from the scope of the teachings herein. Thus, whereas the marshmallow stick of the invention has been described as having a handle of some 5 inches long so as to be easily grasped by an adult or by a child, and as its overall length permits the user to stand or sit back some 3 feet or more from the fire, protected from its heat while toasting the marshmallow, modifications can be made from these dimensions, and still enjoy the benefits of these marshmallow toasting sticks. Similarly, different woods could be employed, or handles of other than wood or of round configuration—and the sticks 10 themselves may be provided with an encircling luminous paint some 12 inches or so up from the taper 14, for example, to make the stick more visible even in the light of the camp fire—, as a safety aid in being able to push the stick away from one's face as it may point when being thrashed about by children at play. For at least such reasons, therefore, resort is to be had to the claims appended hereto for a true understanding of the scope of the invention.

I claim:

1. A marshmallow toasting skewer, particularly suited for camp fire use, comprising:

a substantially round, wooden stick of a length $L_1$ and a cross-sectional diameter $D_1$; and a substantially round handle at a first end of said stick of smaller length $L_2$ and of a larger cross-sectional diameter $D_2$;

with a taper at a second, opposite end of said stick to an end point of smaller cross-sectional diameter $D_3$ of the order of ⅛ inch;

with said length $L_1$ and said diameter $D_1$ of dimension such that when said handle is held by a user to insert a marshmallow into a fire for toasting, the marshmallow is supported in place by said stick and the user is at a distance protected from the heat of the fire;

and with said stick fabricated of a slow burning wood.

2. The skewer of claim 1 wherein said length $L_2$ and said cross-section of diameter $D_2$ are selected of dimension for said handle to be grasped by a child and adult user alike.

3. The skewer of claim 2 wherein said length $L_2$ is substantially of the order of 5 inches.

4. The skewer of claim 3 wherein said cross-sectional diameter $D_2$ is selected of the order 1¼ inches.

5. The skewer of claim 1 wherein said length $L_1$ is substantially of the order of 35 inches.

6. The skewer of claim 5 wherein said cross-sectional diameter $D_1$ is substantially of the order of ¼ inches.

7. The skewer of claim 1 wherein said substantially round handle is fabricated of wood.

8. The skewer of claim 7 wherein said substantially round handle is colored-coded for identifying the user of said wooden stick.

9. The skewer of claim 8 wherein said substantially round handle is color-coded with a non-toxic latex paint.

10. The skewer of claim 8 wherein said substantially round handle is colored in one of a red, blue, yellow and white non-toxic latex paint.

11. The skewer of claim 8 in a package with a second skewer identical except for a different collar coding, for distribution together as a kit.

12. The skewer of claim 1 wherein said handle is also fabricated of a slow burning wood.

13. The skewer of claim 12 wherein said stick and said handle are fabricated of pine.

14. The skewer of claim 1 wherein said length $L_2$ is substantially of the order of 5 inches, wherein said cross-sectional diameter $D_2$ is substantially of the order of 1¼ inches, wherein said length $L_1$ is substantially of the order of 35 inches, and wherein said cross-sectional diameter $D_1$ is substantially of the order of ¼ inches.

15. The skewer of claim 1 wherein said stick extends into said handle a distance to be supported thereby.

16. The skewer of claim 1 wherein said length $L_2$ is substantially of the order of 5 inches, wherein said cross-sectional diameter $D_2$ is substantially of the order of 1¼ inches, wherein said length $L_1$ is substantially of the order of 35 inches, wherein said cross-sectional diameter $D_1$ is substantially of the order of ¼ inches, and wherein said stick extends into said handle a distance substantially 1 inch so as to be supported thereby.

17. The skewer of claim 16 wherein said stick is of a composition which does not begin to burn in said fire until substantially after the marshmallow supported by said stick begins to burn.

* * * * *